(12) United States Patent
Cruz-Hernandez et al.

(10) Patent No.: US 9,947,188 B2
(45) Date of Patent: Apr. 17, 2018

(54) SYSTEMS AND METHODS FOR GENERATING HAPTIC EFFECTS ASSOCIATED WITH AUDIO SIGNALS

(71) Applicant: Immersion Corporation, San Jose, CA (US)

(72) Inventors: Juan Manuel Cruz-Hernandez, Montreal (CA); Jamal Saboune, Montreal (CA); Vincent Levesque, Montreal (CA); Ali Modarres, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/439,227

(22) Filed: Feb. 22, 2017

(65) Prior Publication Data

US 2017/0162010 A1   Jun. 8, 2017

Related U.S. Application Data

(63) Continuation of application No. 14/078,445, filed on Nov. 12, 2013, now Pat. No. 9,619,980.

(60) Provisional application No. 61/874,933, filed on Sep. 6, 2013.

(51) Int. Cl.
    *H04B 3/36* (2006.01)
    *G08B 6/00* (2006.01)
    *G09B 21/00* (2006.01)
    *G06F 3/16* (2006.01)

(52) U.S. Cl.
    CPC .............. *G08B 6/00* (2013.01); *G06F 3/165* (2013.01)

(58) Field of Classification Search
    CPC .... G06F 3/016; G06F 1/163; G06F 2203/011;
    G06F 19/322; G06F 19/3418; G06F 196/345; G06F 3/005; G06F 3/011; B06B 1/045; G09B 21/003; G08B 6/00
    USPC ..................................... 340/407.1–407.2, 7.6
    See application file for complete search history.

(56) References Cited

U.S. PATENT DOCUMENTS

| | | | |
|---|---|---|---|
| 4,250,637 A | 2/1981 | Scott |
| 4,382,251 A | 5/1983 | Fujisawa |
| 5,388,992 A | 2/1995 | Franklin et al. |
| 6,397,154 B1 | 5/2002 | Jones et al. |
| 6,408,696 B1 | 6/2002 | Jong et al. |
| 7,020,701 B1 | 3/2006 | Gelvin et al. |

(Continued)

FOREIGN PATENT DOCUMENTS

| CN | 1546290 A | 11/2004 |
|---|---|---|
| CN | 1599925 A | 3/2005 |

(Continued)

OTHER PUBLICATIONS

U. S. Appl. No. 14/078,438, Non Final Office Action dated Oct. 6, 2016.

(Continued)

*Primary Examiner* — Emily C Terrell
(74) *Attorney, Agent, or Firm* — Kilpatrick Townsend & Stockton LLP

(57) ABSTRACT

Systems and methods for generating haptic effects associated with audio signals are disclosed. One disclosed system for outputting haptic effects includes a processor configured to: receive an audio signal; determine a haptic effect based in part on the audio signal by: identifying one or more components in the audio signal; and determining a haptic effect associated with the one or more components; and output a haptic signal associated with the haptic effect.

20 Claims, 8 Drawing Sheets

(56) References Cited

U.S. PATENT DOCUMENTS

| | | |
|---|---|---|
| 7,208,671 B2 | 4/2007 | Chu et al. |
| 7,761,204 B2 | 7/2010 | König |
| 7,816,838 B2 | 10/2010 | Leskinen et al. |
| 8,068,025 B2 | 11/2011 | Devenyi et al. |
| 8,493,354 B1 | 7/2013 | Birnbaum et al. |
| 8,593,420 B1 | 11/2013 | Buuck |
| 8,655,663 B2 | 2/2014 | Matsuoka et al. |
| 8,754,758 B1 | 6/2014 | Ullrich et al. |
| 8,849,663 B2 | 9/2014 | Bradley et al. |
| 8,896,524 B2 | 11/2014 | Birnbaum et al. |
| 8,976,980 B2 | 3/2015 | Tsutsui et al. |
| 9,489,965 B2 | 11/2016 | Scheffer et al. |
| 2003/0067440 A1 | 4/2003 | Rank |
| 2003/0068053 A1 | 4/2003 | Chu |
| 2007/0178942 A1 | 8/2007 | Sadler et al. |
| 2007/0242040 A1 | 10/2007 | Ullrich et al. |
| 2008/0102902 A1 | 5/2008 | Epley |
| 2008/0123725 A1 | 5/2008 | J et al. |
| 2009/0096632 A1 | 4/2009 | Ullrich et al. |
| 2009/0128306 A1 | 5/2009 | Luden et al. |
| 2009/0231276 A1 | 9/2009 | Ullrich et al. |
| 2009/0306985 A1 | 12/2009 | Roberts et al. |
| 2010/0067710 A1 | 3/2010 | Hendriks et al. |
| 2010/0228530 A1 | 9/2010 | Valero et al. |
| 2010/0268745 A1 | 10/2010 | Choi et al. |
| 2010/0274817 A1 | 10/2010 | Choi et al. |
| 2011/0063208 A1 | 3/2011 | Van Den Eerenbeemd et al. |
| 2011/0093100 A1 | 4/2011 | Ramsay et al. |
| 2011/0099596 A1 | 4/2011 | Ure et al. |
| 2011/0102160 A1 | 5/2011 | Heubel et al. |
| 2011/0125787 A1 | 5/2011 | Choi et al. |
| 2011/0125788 A1 | 5/2011 | Joo et al. |
| 2011/0125789 A1 | 5/2011 | Joo et al. |
| 2011/0125790 A1 | 5/2011 | Choi et al. |
| 2011/0128132 A1 | 6/2011 | Ullrich et al. |
| 2011/0137137 A1 | 6/2011 | Shin et al. |
| 2011/0169908 A1 | 7/2011 | Lee et al. |
| 2011/0188832 A1 | 8/2011 | Choi et al. |
| 2011/0216179 A1 | 9/2011 | Dialameh et al. |
| 2011/0254671 A1 | 10/2011 | Okimoto et al. |
| 2012/0019352 A1 | 1/2012 | Ménard et al. |
| 2012/0028577 A1 | 2/2012 | Rodriguez et al. |
| 2012/0032906 A1 | 2/2012 | Lemmens et al. |
| 2012/0059697 A1 | 3/2012 | Lin et al. |
| 2012/0099734 A1 | 4/2012 | Joly et al. |
| 2012/0150928 A1 | 6/2012 | Ward et al. |
| 2012/0200520 A1 | 8/2012 | Harris |
| 2012/0206246 A1 | 8/2012 | Cruz-Hernandez et al. |
| 2012/0206247 A1 | 8/2012 | Bhatia et al. |
| 2012/0268412 A1 | 10/2012 | Cruz-Hernandez et al. |
| 2012/0308971 A1 | 12/2012 | Shin et al. |
| 2012/0310587 A1 | 12/2012 | Tu et al. |
| 2013/0044049 A1 | 2/2013 | Biggs et al. |
| 2013/0063256 A1 | 3/2013 | Tartz et al. |
| 2013/0227410 A1 | 8/2013 | Sridhara et al. |
| 2013/0245980 A1 | 9/2013 | Forbes et al. |
| 2013/0265286 A1 | 10/2013 | Da Costa et al. |
| 2013/0278536 A1 | 10/2013 | Nakamura et al. |
| 2013/0325456 A1 | 12/2013 | Takagi et al. |
| 2014/0039796 A1 | 2/2014 | Thompson et al. |
| 2014/0055358 A1 | 2/2014 | Birnbaum et al. |
| 2014/0074945 A1 | 3/2014 | Kanevsky et al. |
| 2014/0118125 A1 | 5/2014 | Bhatia et al. |
| 2014/0176415 A1 | 6/2014 | Buuck et al. |
| 2014/0205260 A1 | 7/2014 | Lacroix et al. |
| 2014/0237495 A1 | 8/2014 | Jang et al. |
| 2014/0347177 A1 | 11/2014 | Phan et al. |
| 2015/0070150 A1 | 3/2015 | Levesque et al. |
| 2015/0070265 A1 | 3/2015 | Cruz-Hernandez et al. |
| 2015/0199015 A1 | 7/2015 | Ullrich et al. |

FOREIGN PATENT DOCUMENTS

| | | |
|---|---|---|
| CN | 1620327 A | 5/2005 |
| CN | 101828382 A | 9/2010 |
| CN | 102341766 A | 2/2012 |
| CN | 102597914 A | 7/2012 |
| CN | 102750957 A | 10/2012 |
| CN | 104423592 | 3/2015 |
| CN | 104423593 | 3/2015 |
| CN | 104423594 | 3/2015 |
| CN | 104427390 | 3/2015 |
| EP | 2 624 099 A1 | 8/2013 |
| JP | 2015053048 | 3/2015 |
| JP | 2015053052 | 3/2015 |
| JP | 2015053053 | 3/2015 |
| JP | 2015053054 | 3/2015 |
| WO | 2003/032289 A1 | 4/2003 |
| WO | 2004/030341 | 4/2004 |
| WO | 2005/048541 A1 | 5/2005 |
| WO | 2009/051976 A1 | 4/2009 |
| WO | 2013096327 | 6/2013 |

OTHER PUBLICATIONS

U. S. Appl. No. 14/078,438, Final Office Action dated Feb. 4, 2016.
U. S. Appl. No. 14/078,438, Non-Final Office Action dated Jul. 16, 2015.
U. S. Appl. No. 14/078,442, Final Office Action dated Jan. 6, 2016.
U. S. Appl. No. 14/078,442, Non-Final Office Action dated May 27, 2016.
U. S. Appl. No. 14/078,442, Non-Final Office Action dated Sep. 14, 2015.
U. S. Appl. No. 14/078,442, Non-Final Office Action dated Apr. 3, 2015.
U. S. Appl. No. 14/078,445, Final Office Action dated Oct. 25, 2016.
U. S. Appl. No. 14/078,445, Non-Final Office Action dated May 26, 2016.
U. S. Appl. No. 14/078,445, Final Office Action dated Nov. 18, 2015.
U. S. Appl. No. 14/078,445, Non-Final Office Action dated Jul. 20, 2015.
U. S. Appl. No. 14/145,650, Final Office Action dated Sep. 23, 2016.
U. S. Appl. No. 14/145,650, Non-Final Office Action dated Feb. 23, 2016.
U. S. Appl. No. 14/145,650, Final Office Action dated Aug. 26, 2015.
U. S. Appl. No. 14/145,650, Non-Final Office Action dated May 8, 2015.
U. S. Appl. No. 14/145,650, Non-Final Office Action dated Mar. 26, 2015.
European Patent Office Application No. 14183978.7, Extended European Search Report dated Mar. 20, 2015.
European Patent Office Application No. EP14183980.3, Extended European Search Report dated Mar. 31, 2015.
European Patent Office Application No. EP14183981.1, Extended European Search Report dated Mar. 25, 2015.
European Patent Office Application No. 4183983.7, Extended European Search Report dated Apr. 9, 2015.
Lee et al., "Haptic Interaction with User Manipulation for Smartphone", Consumer Electronics (ICCE), 2013 IEEE International Conference, Jan. 11, 2013, pp. 47-48.
CN 201410452984, "Office Action", dated Feb. 6, 2018, 9 pages.
CN 201410453219, "Office Action", dated Feb. 5, 2018, 8 pages.
EP 14183978, "Office Action", dated Feb. 6, 2018, 4 pages.

SYSTEMS AND METHODS FOR GENERATING HAPTIC EFFECTS ASSOCIATED WITH AUDIO SIGNALS

CROSS REFERENCE TO RELATED APPLICATIONS

This application is a continuation of and claims priority to U.S. patent application Ser. No. 14/078,445 filed on Nov. 12, 2013, and entitled "Systems and Methods for Generating Haptic Effects Associated With Audio Signals," which claims priority to U.S. Provisional Application No. 61/874,933 filed on Sep. 6, 2013 and entitled "Audio to Haptics" the entirety of which is hereby incorporated herein by reference.

U.S. patent application Ser. No. 14/078,445 is related to U.S. patent application Ser. No. 14/078,438, filed on Nov. 12, 2013 and entitled "Systems and Methods for Generating Haptic Effects Associated with Transitions in Audio Signals,", the entirety of which is hereby incorporated herein by reference.

U.S. patent application Ser. No. 14/078,445 is related to U.S. patent application Ser. No. 14/078,442, filed on Nov. 12, 2013 and entitled "Systems and Methods for Generating Haptic Effects Associated with an Envelope in Audio Signals,", the entirety of which is hereby incorporated herein by reference.

FIELD OF THE INVENTION

The present invention generally relates to haptic feedback and more particularly to systems and methods for generating haptic effects associated with audio signals.

BACKGROUND

Touch-enabled devices have become increasingly popular. For instance, mobile and other devices may be configured with touch-sensitive displays so that a user can provide input by touching portions of the touch-sensitive display. As another example, a touch-enabled surface separate from a display may be used for input, such as a trackpad, mouse, or other device. Furthermore, some touch-enabled devices make use of haptic effects, for example, haptic effects configured to simulate a texture or a friction on a touch-surface. In some devices these haptic effects may correlate to audio or other effects output by the device. However, due to latency in processing and outputting the audio and haptic effects, these effects may be less compelling. Thus, there is a need for improved haptic effects associated with audio effects.

SUMMARY

Embodiments of the present disclosure include devices featuring haptic effects felt on a touch area and associated with audio signals. These haptic effects may include, but are not limited to, changes in texture, changes in coefficient of friction, and/or simulation of boundaries, obstacles, or other discontinuities in the touch surface that can be perceived through use of an object in contact with the surface.

In one embodiment, a system of the present disclosure may comprise a processor configured to: receive an audio signal; determine a haptic effect based in part on the audio signal by: identifying one or more components in the audio signal; and determining a haptic effect associated with the one or more components; and output a haptic signal associated with the haptic effect. Another embodiment comprises a method for determining a haptic effect based in part on the audio signal.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1A:
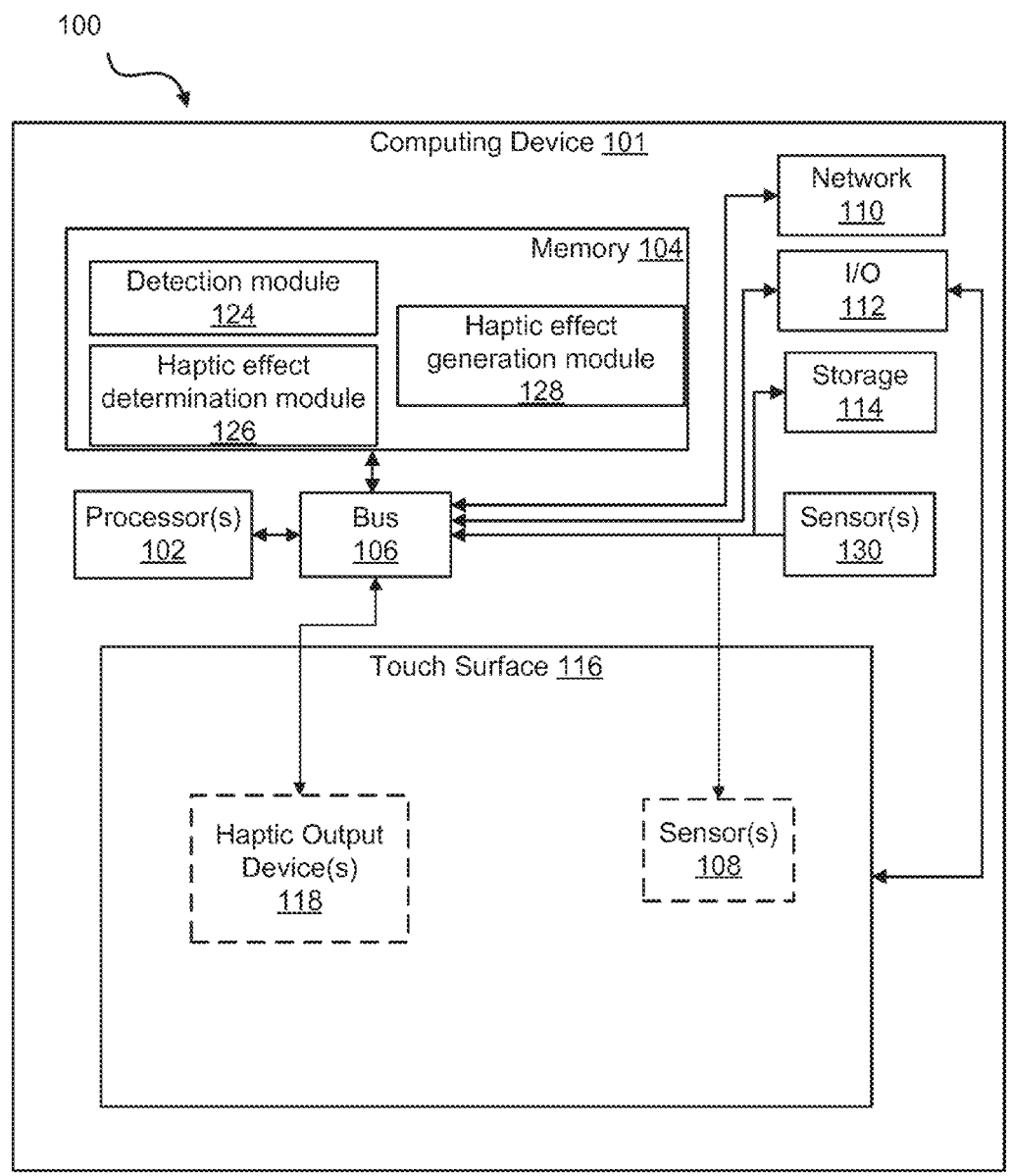
FIG. 1A shows an illustrative system for generating haptic effects associated with audio signals.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure include modifications and variations as come within the scope of the appended claims and their equivalents.

Illustrative Example of a Device for Generating Haptic Effects Associated with Audio Signals One illustrative embodiment of the present disclosure comprises a computing system, such as a smartphone, tablet, or portable music device. In some embodiments, the computing system may comprise a wearable device, or be embedded in furniture or clothes. The computing system can include and/or may be in communication with one or more sensors, such as an accelerometer, as well as sensors (e.g., optical, resistive, or capacitive) for determining a location of a touch relative to a display area corresponding in this example to the screen of the device.

As the user interacts with the device, one or more haptic output devices, for example, actuators are used to provide haptic effects. For example, a haptic effect may be output to simulate the presence of a texture on the surface of the device. In one such embodiment, as the user's finger moves across the surface, a vibration, electric field, or other effect may be output to simulate the feeling of a texture on the surface of the device. Similarly, in another embodiment, as the user moves a finger across the device, the perceived coefficient of friction of the screen can be varied (e.g., increased or decreased) based on the position, velocity, and/or acceleration of the finger or the length of time the finger has been in contact with the device. In other embodiments, the mobile device may output haptic effects such as vibrations, pops, clicks, or surface deformations. In some embodiments, haptic effects may be output for a certain period of time (e.g., 50 ms) when a certain event occurs. In other embodiments, the haptic effect may vary with a fixed period, e.g., in an embodiment, a texture may be output that varies at a 100 Hz rate, e.g., a 100 Hz sinusoid.

In the illustrative embodiment, the haptic effect comprises an effect associated with an audio signal. For example, in some embodiments, the haptic effect may comprise a haptic effect associated with an audio track. In some embodiments, the user may be listening to the audio track (e.g., using headphones, speakers, or some other type of audio output device) at the time the haptic effect is determined. In other embodiments, the haptic effect may be determined in advance as part of a "haptic track." This haptic track may be distributed along with the audio file, so that it may be played alongside the audio track. In some embodiments, the haptic track may be synched to the audio track such that haptic effects correspond to components in the audio track. In other embodiments, the haptic effect may be associated with an Audio-Visual ("AV") track, for example, the audio portion of a video file.

In one illustrative embodiment, haptic effects may be determined by analyzing an audio signal to identify or determine components within the audio signal. In some embodiments, a component may comprise an event within the audio signal, such as a discrete event, e.g., a gunshot, explosion, scream, or fight. Further, in some embodiments, a component may comprise a source that is associated with a recurring audio effect, e.g., a guitar, piano, or speaker. Further, in some embodiments, the component may comprise a feature occurring within the audio signal. The term feature is a term of art signifying a descriptor of an audio segment, which in some embodiments may enable an algorithm to classify a segment of the audio signal, for example, by identifying an emotion. In one embodiment, Mel-frequency cepstrums (MFCC) may be used as audio features used for classification. In such an embodiment, the system may identify events or sources using those MFCCs or other features or descriptors. Further, in some embodiments, an audio signal may include audio components such as the sound of a voice (e.g., speech or singing), along with components associated with action (e.g., gunfire, automotive noises, and special effects), and background noise (e.g., music or mechanical sounds). In one illustrative embodiment, the system may analyze an audio file to determine the location of these components, and assign haptic effects to specific components. In a further embodiment, the system may determine that certain sounds should not comprise an associated haptic effect. Thus, in one embodiment, the system may determine the presence of certain components within an audio signal and determine not to assign a haptic effect to those components.

In some embodiments, a system of the present disclosure may determine components in an audio signal by dividing the audio signal into a plurality of time, frequency, or amplitude based segments. These segments may then be individually analyzed for the presence of certain components (e.g., speech, special effects, background noise, or music). The system may then classify each segment based on the presence of one or more components. For example, a segment may comprise sounds associated with gunfire, explosions, and a car revving. In such an embodiment, the system may classify the segment as an "action" segment. Further, in some embodiments, the system may assign a haptic effect based on the classification. In one such embodiment, in the example above, the system may associate an action segment of the audio file with a specific haptic effect, or set of haptic effects, e.g., high intensity vibrations synched with the occurrence of components such as the gunfire and explosions.

Further, in some embodiments of the present disclosure, the system may analyze an audio signal and isolate the source of one or more components in the audio signal. For example, the system may analyze the audio signal to detect and isolate various sources of sounds. In one embodiment, an audio signal may comprise a mixed audio signal (e.g., a signal that includes speech, special effects (e.g., explosions, gunfire, mechanical noises), animal sounds, or musical instruments (e.g., piano, guitar, drums, machines etc.), in such an embodiment, the system may isolate certain sources in the audio signal, e.g., isolating the speech, music, or special effects. In such an embodiment, once the system separates the source of a sound, the system may assign a haptic effect to the source. For example, in one illustrative embodiment, the system may separate the sounds generated by a guitar from a signal associated with a rock song. In such an embodiment, the system may apply the haptic effect to the guitar and no other components of the audio signal. Alternatively, in some embodiments, the system may isolate a plurality of sources, and assign haptic effects to one or more of the plurality of sources. For example, in one illustrative embodiment, the system may separate the guitar and bass from the remainder of the audio track. In such an embodiment, the system may apply the haptic effect to both the guitar signal and the bass signal. Further, in one embodiment, the system may isolate the components (e.g., the guitar or bass signal) and determine to remove haptic effects associated with those components. For example, in one embodiment, the system may clean a haptic track created by automatic conversion to remove haptic effects associated with the components.

In another embodiment of the present disclosure, the system may be configured to detect speech in an audio file. As described above, in some embodiments, the system may isolate the source of the speech, e.g., isolate the speaker or speakers. Further, in some embodiments, the system may be configured to analyze the speech to determine one or more emotions associated with the speaker. For example, the system may analyze the frequency, pitch, or tone to determine one or more emotions associated with the speaker. Further, in some embodiments, the system may determine or modify the haptic effect so that it is associated with the emotions of the speaker. For example, in some embodiments, a haptic effect associated with an angry speaker (or a scene associated with an angry speaker) may be more intense than the haptic effect associated with an amorous speaker. Alternatively, in some embodiments, the specific emotion may comprise an emotion for which there is no associated haptic effect. For example, in some embodiments, an emotion such as sadness may comprise no haptic effect, thus in some embodiments, when the system detects that a speaker is sad, the system will not assign a haptic effect to the speaker, or to the scene associated with the speaker. Further, in some embodiments, the system may isolate the components of the audio signal, e.g., components associated with speech, and determine to remove haptic effects associated with those components. For example, in one embodiment, the system may clean a haptic track created by automatic conversion to remove haptic effects associated with speech.

As will be discussed in further detail below, any number of components may be found in an audio signal. Embodiments of the present disclosure provide systems and methods for identifying these components, and then determining and outputting haptic effects that are synchronized with these components. Further, in some embodiments, the systems and methods discussed herein may be used to determine haptic effects associated with other types of signals, e.g., pressure, acceleration, velocity, or temperature signals.

Illustrative Systems for Generating Haptic Effects Associated with Audio Signals FIG. 1A shows an illustrative system 100 for generating haptic effects associated with audio signals. Particularly, in this example, system 100 comprises a computing device 101 having a processor 102 interfaced with other hardware via bus 106. A memory 104, which can comprise any suitable tangible (and non-transitory) computer-readable medium such as RAM, ROM, EEPROM, or the like, embodies program components that configure operation of the computing device. In this example, computing device 101 further includes one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., a transceiver/antenna for accessing a CDMA, GSM, UMTS, or other mobile communications network(s)).

I/O components 112 may be used to facilitate connection to devices such as one or more displays, keyboards, mice, speakers, microphones, cameras, and/or other hardware used to input data or output data. For example, in some embodiments, I/O components 112 may include speakers configured to play audio signals provided by processor 102. Storage 114 represents nonvolatile storage such as magnetic, optical, or other storage media included in device 101. In some embodiments, storage 114 may be configured to store audio files configured to be played to the user via I/O components 112.

System 100 further includes a touch surface 116, which, in this example, is integrated into device 101. Touch surface 116 represents any surface that is configured to sense touch input of a user. One or more sensors 108, 130 are configured to detect a touch in a touch area when an object contacts a touch surface and provide appropriate data for use by processor 102. Any suitable number, type, or arrangement of sensors can be used. For example, resistive and/or capacitive sensors may be embedded in touch surface 116 and used to determine the location of a touch and other information, such as pressure. As another example, optical sensors with a view of the touch surface may be used to determine the touch position. In some embodiments, sensor 108 and touch surface 116 may comprise a touch screen or a touch-pad. For example, in some embodiments, touch surface 116 and sensor 108 may comprise a touch screen mounted overtop of a display configured to receive a display signal and output an image to the user. In other embodiments, the sensor 108 may comprise an LED detector. For example, in one embodiment, touch surface 116 may comprise an LED finger detector mounted on the side of a display. In some embodiments, the processor is in communication with a single sensor 108, in other embodiments, the processor is in communication with a plurality of sensors 108, 130 for example, a first touch screen and a second touch screen. The sensor 108 is configured to detect user interaction, and based on the user interaction, transmit signals to processor 102. In some embodiments, sensor 108 may be configured to detect multiple aspects of the user interaction. For example, sensor 108 may detect the speed and pressure of a user interaction, and incorporate this information into the interface signal.

Device 101 further comprises a haptic output device 118. In the example shown in FIG. 1A haptic output device 118 is in communication with processor 102 and is coupled to touch surface 116. In some embodiments, haptic output device 118 is configured to output a haptic effect simulating a texture on the touch surface in response to a haptic signal. Additionally or alternatively, haptic output device 118 may provide vibrotactile haptic effects that move the touch surface in a controlled manner. Some haptic effects may utilize an actuator coupled to a housing of the device, and some haptic effects may use multiple actuators in sequence and/or in concert. For example, in some embodiments, a surface texture may be simulated by vibrating the surface at different frequencies. In such an embodiment, haptic output device 118 may comprise one or more of, for example, a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA). In some embodiments, haptic output device 118 may comprise a plurality of actuators, for example an ERM and an LRA. In some embodiments, the haptic device 118 may comprise or be embedded in a wearable device, furniture, or clothing.

Although a single haptic output device 118 is shown here, embodiments may use multiple haptic output devices of the same or different type to output haptic effects, for example, to simulate surface textures or vary the perceived coefficient of friction on the touch surface. For example, in one embodiment, a piezoelectric actuator may be used to displace some or all of touch surface 116 vertically and/or horizontally at ultrasonic frequencies, such as by using an actuator moving at frequencies greater than 20-25 kHz in some embodiments. In some embodiments, multiple actuators such as eccentric rotating mass motors and linear resonant actuators can be used alone or in concert to provide different textures, variations in the coefficient of friction, or other haptic effects.

In still other embodiments, haptic output device 118 may apply electrostatic friction or attraction, for example, by use of an electrostatic surface actuator, to simulate a texture on the surface of touch surface 116. Similarly, in some embodiments, haptic output device 118 may use electrostatic attraction to vary the friction the user feels on the surface of touch surface 116. For example, in one embodiment, haptic output device 118 may comprise an electrostatic display or any other device that applies voltages and currents instead of mechanical motion to generate a haptic effect. In such an embodiment, an electrostatic actuator may comprise a conducting layer and an insulating layer. In such an embodiment, the conducting layer may be any semiconductor or other conductive material, such as copper, aluminum, gold, or silver. And the insulating layer may be glass, plastic, polymer, or any other insulating material. Furthermore, the processor 102 may operate the electrostatic actuator by applying an electric signal to the conducting layer. The electric signal may be an AC signal that, in some embodiments, capacitively couples the conducting layer with an object near or touching touch surface 116. In some embodiments, the AC signal may be generated by a high-voltage amplifier. In other embodiments the capacitive coupling may simulate a friction coefficient or texture on the surface of the touch surface 116. For example, in one embodiment, the surface of touch surface 116 may be smooth, but the capacitive coupling may produce an attractive force between an object near the surface of touch surface 116. In some embodiments, varying the levels of attraction between the object and the conducting layer can vary the simulated texture on an object moving across the surface of touch surface 116 or vary the coefficient of friction felt as the object moves across the surface of touch surface 116. Furthermore, in some embodiments, an electrostatic actuator may be used in conjunction with traditional actuators to vary the simulated texture on the surface of touch surface 116. For example, the actuators may vibrate to simulate a change in the texture of the surface of touch surface 116, while at the same time; an electrostatic actuator may simulate a different texture, or other effects, on the surface of touch surface 116.

One of ordinary skill in the art will recognize that, in addition to varying the coefficient of friction, other techniques or methods can be used to, for example, simulate a texture on a surface. In some embodiments, a texture may be simulated or output using a flexible surface layer configured to vary its texture based upon contact from a surface reconfigurable haptic substrate (including, but not limited to, e.g., fibers, nanotubes, electroactive polymers, piezoelectric elements, or shape memory allows) or a magnetorheological fluid. In another embodiment, surface texture may be varied by raising or lowering one or more surface components, for example, with a deforming mechanism, air or fluid pockets, local deformation of materials, resonant mechanical elements, piezoelectric materials, micro-electromechanical systems ("MEMS") elements, thermal fluid pockets, MEMS pumps, variable porosity membranes, or laminar flow modulation.

In some embodiments an electrostatic actuator may be used to generate a haptic effect by stimulating parts of the body near or in contact with the touch surface 116. For example, in some embodiments an electrostatic actuator may stimulate the nerve endings in the skin of a user's finger or components in a stylus that can respond to the electrostatic actuator. The nerve endings in the skin, for example, may be stimulated and sense the electrostatic actuator (e.g., the capacitive coupling) as a vibration or some more specific sensation. For example, in one embodiment, a conducting layer of an electrostatic actuator may receive an AC voltage signal that couples with conductive parts of a user's finger. As the user touches the touch surface 116 and moves his or her finger on the touch surface, the user may sense a texture of prickliness, graininess, bumpiness, roughness, stickiness, or some other texture.

Further, in some embodiments, multiple actuators may be used to output haptic effects. This may serve to increase the range of effects that haptic output devices 118 can output. For example, in some embodiments, vibrating actuators may be used in coordination with electrostatic actuators to generate a broad range of effects. In still further embodiments, additional types of haptic output devices, such as devices configured to deform a touch surface, may be used in coordination with other haptic output devices, such as vibrating actuators.

Turning to memory 104, exemplary program components 124, 126, and 128 are depicted to illustrate how a device may be configured to generate haptic effects associated with audio signals. In this example, a detection module 124 configures processor 102 to monitor touch surface 116 via sensor 108 to determine a position of a touch. For example, module 124 may sample sensor 108 in order to track the presence or absence of a touch and, if a touch is present, to track one or more of the location, path, velocity, acceleration, pressure, and/or other characteristics of the touch over time.

Haptic effect determination module 126 represents a program component that analyzes audio data, such as data from an audio effect, to select a haptic effect to generate. Particularly, module 126 comprises code that determines, based on the audio data, a type of haptic effect to output.

Haptic effect generation module 128 represents programming that causes processor 102 to generate and transmit a haptic signal to haptic output device 118, which causes haptic output device 118 to generate the selected haptic effect. For example, generation module 128 may access stored waveforms or commands to send to haptic output device 118. As another example, haptic effect generation module 128 may receive a desired type of effect and utilize signal processing algorithms to generate an appropriate signal to send to haptic output device 118. Some embodiments may utilize multiple haptic output devices in concert to output the haptic effect. In some embodiments, processor 102 may stream or transmit the haptic signal to the haptic output device 118.

Figure 1B:
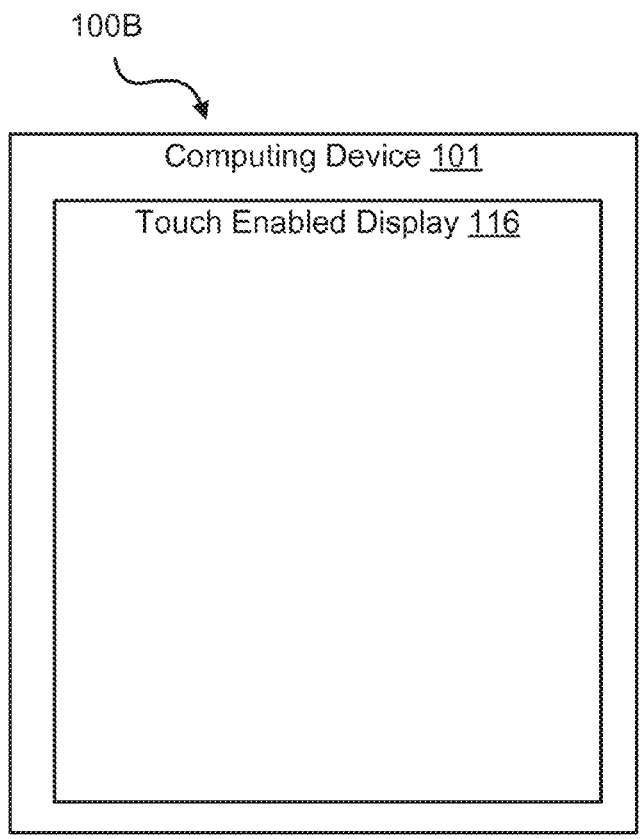
FIG. 1B shows an external view of one embodiment of the system shown in FIG. 1A.

A touch surface may or may not overlay (or otherwise correspond to) a display, depending on the particular configuration of a computing system. In FIG. 1B, an external view of a computing system 100B is shown. Computing device 101 includes a touch-enabled display 116 that combines a touch surface and a display of the device. The touch surface may correspond to the display exterior or one or more layers of material above the actual display components.

Figure 1C:
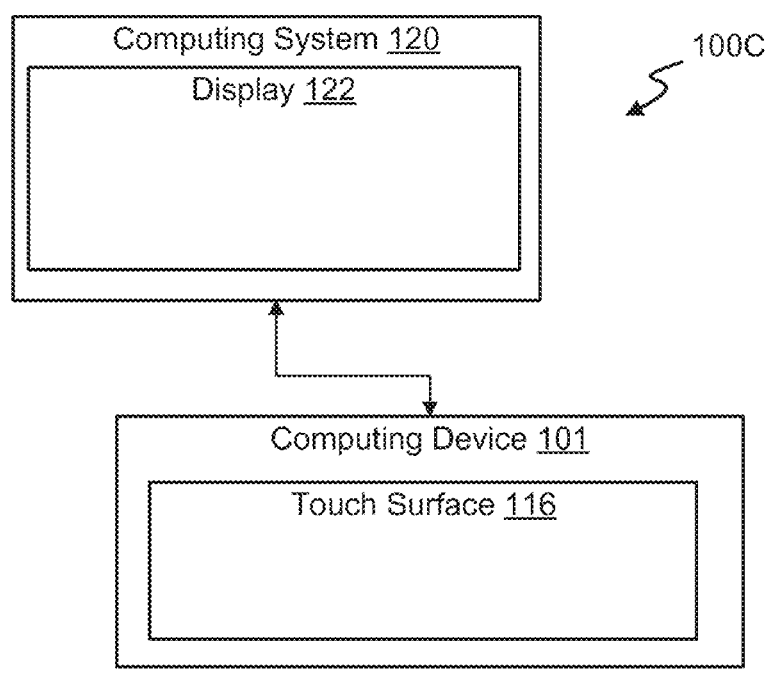
FIG. 1C illustrates an external view of another embodiment of the system shown in FIG. 1A.

FIG. 1C illustrates another example of a touch-enabled computing system 100C in which the touch surface does not overlay a display. In this example, a computing device 101 comprises a touch surface 116 which may be mapped to a graphical user interface provided in a display 122 that is included in computing system 120 interfaced to device 101. For example, computing device 101 may comprise a mouse, trackpad, or other device, while computing system 120 may comprise a desktop or laptop computer, set-top box (e.g., DVD player, DVR, cable television box), or another computing system. As another example, touch surface 116 and display 122 may be disposed in the same device, such as a touch enabled trackpad in a laptop computer comprising display 122. Whether integrated with a display or otherwise, the depiction of planar touch surfaces in the examples herein is not meant to be limiting. Other embodiments include curved or irregular touch enabled surfaces that are further configured to provide surface-based haptic effects.

Figure 2A:
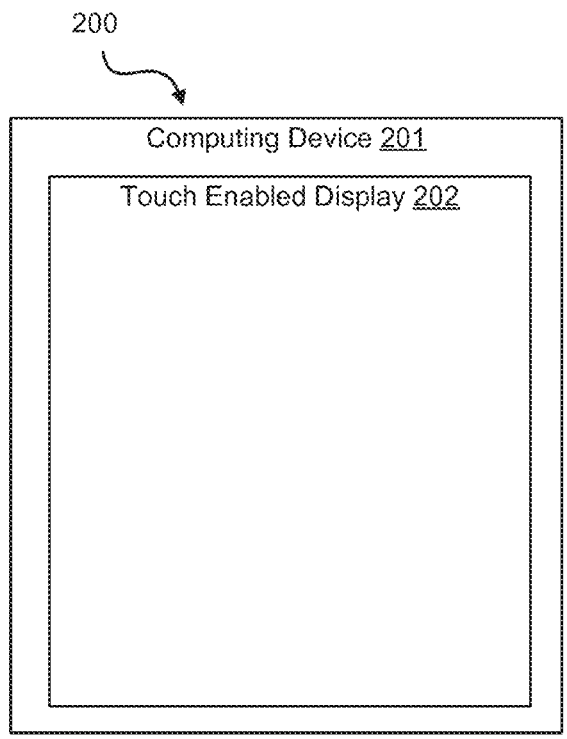
FIG. 2A illustrates an example embodiment for generating haptic effects associated with audio signals.
Figure 2B:
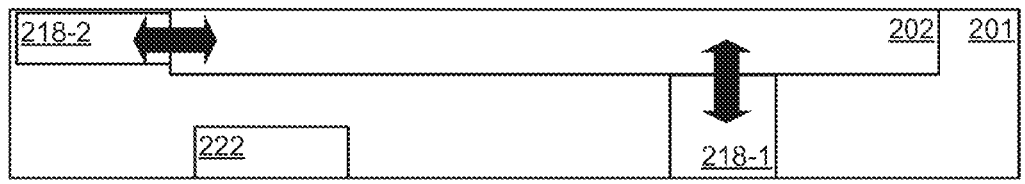
FIG. 2B illustrates an example embodiment for generating haptic effects associated with audio signals.

FIGS. 2A-2B illustrate an example of devices that may generate haptic effects associated with audio signals. FIG. 2A is a diagram illustrating an external view of a system 200 comprising a computing device 201 that comprises a touch enabled display 202. FIG. 2B shows a cross-sectional view of device 201. Device 201 may be configured similarly to device 101 of FIG. 1A, though components such as the processor, memory, sensors, and the like are not shown in this view for purposes of clarity.

As can be seen in FIG. 2B, device 201 features a plurality of haptic output devices 218 and an additional haptic output device 222. Haptic output device 218-1 may comprise an actuator configured to impart vertical force to display 202, while 218-2 may move display 202 laterally. In this example, the haptic output devices 218 and 222 are coupled directly to the display, but it should be understood that the haptic output devices 218 and 222 could be coupled to another touch surface, such as a layer of material on top of display 202. Furthermore, it should be understood that one or more of haptic output devices 218 or 222 may comprise an electrostatic actuator, as discussed above. Furthermore, haptic output device 222 may be coupled to a housing containing the components of device 201. In the examples of FIGS. 2A-2B, the area of display 202 corresponds to the touch area, though the principles could be applied to a touch surface completely separate from the display.

In one embodiment, haptic output devices 218 each comprise a piezoelectric actuator, while additional haptic output device 222 comprises an eccentric rotating mass motor, a linear resonant actuator, or another piezoelectric actuator. Haptic output device 222 can be configured to provide a vibrotactile haptic effect in response to a haptic signal from the processor. The vibrotactile haptic effect can be utilized in conjunction with surface-based haptic effects and/or for other purposes. For example, each actuator may be used in conjunction to output a vibration, simulate a texture, or vary the coefficient of friction on the surface of display 202.

In some embodiments, either or both haptic output devices 218-1 and 218-2 can comprise an actuator other than a piezoelectric actuator. Any of the actuators can comprise a piezoelectric actuator, an electromagnetic actuator, an electroactive polymer, a shape memory alloy, a flexible composite piezo actuator (e.g., an actuator comprising a flexible material), electrostatic, and/or magnetostrictive actuators, for example. Additionally, haptic output device 222 is shown, although multiple other haptic output devices can be coupled to the housing of device 201 and/or haptic output devices 222 may be coupled elsewhere. Device 201 may comprise multiple haptic output devices 218-1/218-2 coupled to the touch surface at different locations, as well.

Figure 3:
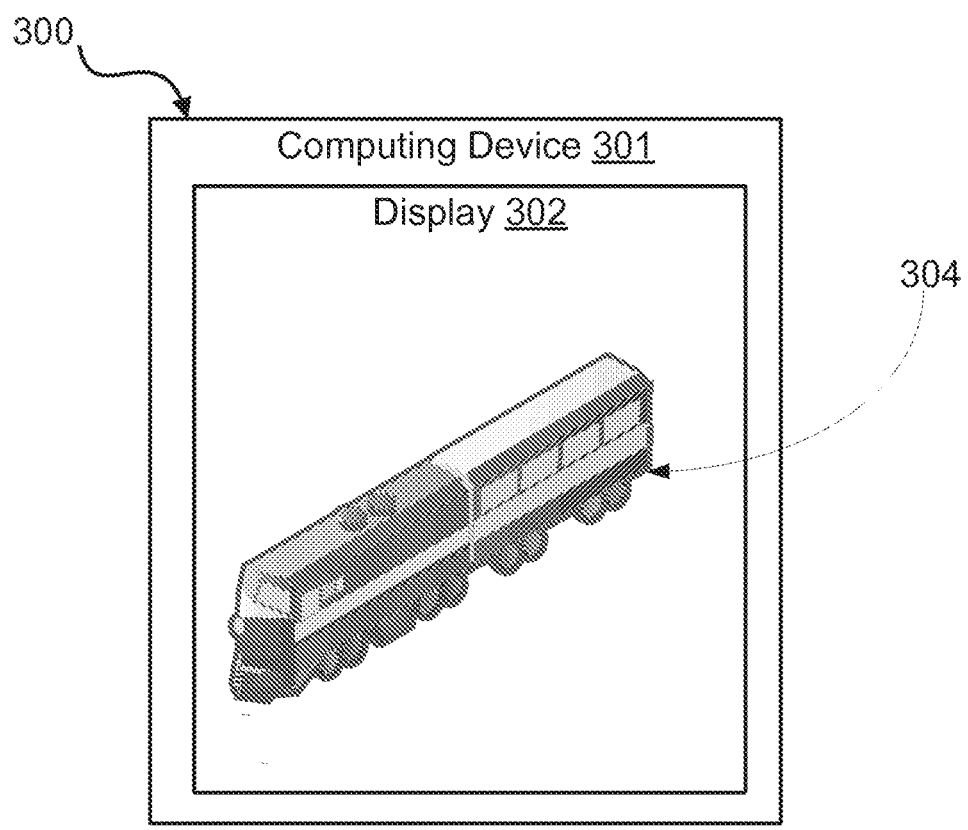
FIG. 3 illustrates an example embodiment for generating haptic effects associated with audio signals according to one embodiment.

Turning now to FIG. 3, FIG. 3 shows one embodiment of a system for generating haptic effects associated with audio signals according to the present disclosure. The system 300 shown in FIG. 3 comprises a computing device 301, with a display 302 showing a video comprising a train 304. In some embodiments computing device 301 may comprise a handheld computing device, e.g., a mobile phone, a tablet, a music player, or a laptop computer. In another embodiment, computing device 301 may comprise a multifunction controller. For example, a controller for use in a kiosk, ATM, or other computing device. Further, in one embodiment, computing device 301 may comprise a controller for use in a vehicle.

The video 304 may further comprise audible effects played by audio output devices (e.g., speakers or headphones) coupled to the computing device 301 (not shown in FIG. 3). Embodiments of the present disclosure comprise methods for determining haptic effects based on the audio signal. For example, some embodiments may separate the audio signal from the video signal, and then perform various operations, discussed in further detail below, to determine haptic effects to output alongside the audio track.

In some embodiments, display 302 may comprise a touch-enabled display. Further, rather than displaying a video, display 302 may provide the user with a graphical user interface, e.g., a graphical user interface for a kiosk, ATM, stereo system, car dashboard, telephone, computer, music player, or some other graphical user interface known in the art. In such an embodiment, computing device 301 may determine haptic effects based on audio signals associated with the graphical user interface. For example, in some embodiments the graphical user interface may comprise audio effects output when the user interacts with icons, buttons, or other interface elements. In some embodiments, computing device 301 may further determine haptic effects associated with one or more of these audio effects. In some embodiments, the computing device 301 may derive haptic effects from the audio signal or any other sensor derived signal, e.g., signals from sensors such as user interfaces, accelerometers, gyroscopes, Inertial Measurement Units, etc.

In some embodiments, a video signal may not be included. For example, in some embodiments, haptic effects may be played alongside an audio track that is not associated with a video. In such an embodiment, the systems and methods disclosed herein may operate on the audio signal, in real time, as the signal is being played or at a time in advance of the signal being played. For example, in some embodiments, an audio signal may be processed to determine a haptic track, which is stored on a data store for playing in the future. In such an embodiment, the haptic track may be determined by the computing device that plays the haptic track. In other embodiments, the haptic track may be created by the author or distributor of the audio track. In such an embodiment, the author or distributor may distribute the haptic track along with the audio track.

Figure 4:
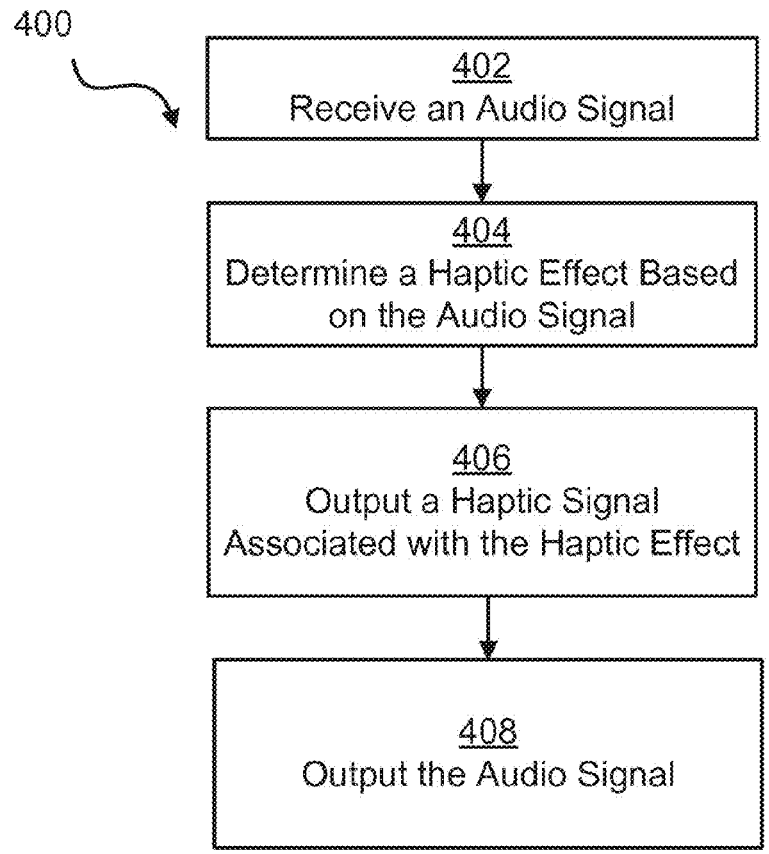
FIG. 4 illustrates a flow chart for a method for generating haptic effects associated with audio signals according to one embodiment.
Figure 5:
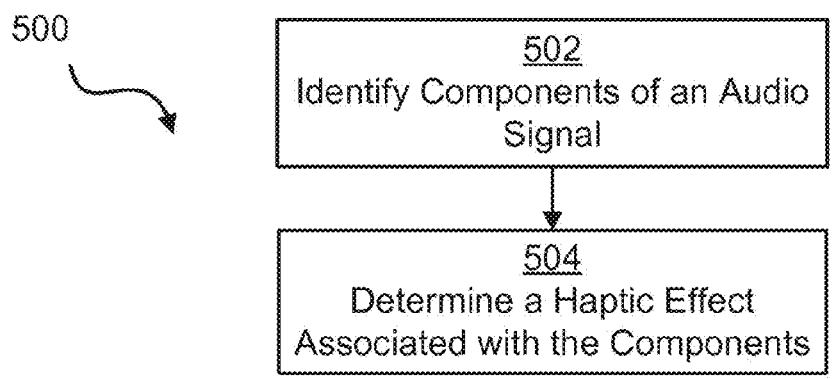
FIG. 5 illustrates a flow chart for a method for generating haptic effects associated with audio signals according to one embodiment.

Illustrative Methods for Generating Haptic Effects Associated with Audio Signals FIGS. 4 and 5 are flowcharts showing illustrative methods 400 and 500 for generating haptic effects associated with audio signals. In some embodiments, the steps in flow charts 400 and 500 may be implemented in program code executed by a processor, for example, the processor in a general purpose computer, mobile device, or server. In some embodiments, these steps may be implemented by a group of processors. In some embodiments, the steps shown in FIGS. 4 and 5 may be performed in a different order. Alternatively, in some embodiments, one or more of the steps shown in FIGS. 4 and 5 may be skipped or additional steps not shown in FIGS. 4 and 5 may be performed. The steps in FIGS. 4 and 5 are described with regard to an audio signal. However, in some embodiments, the methods may be used to determine haptic effects associated with other types of signals, e.g., pressure, acceleration, velocity, or temperature signals. The steps below are described with reference to components described above with regard to system 100 shown in FIG. 1A.

The method 400 begins when processor 102 receives an audio signal 402. In some embodiments the audio signal may comprise a signal associated with a video playing on computing device 101. In other embodiments, the audio signal may comprise a signal associated with an audio file that is currently playing on computing device 101. In still other embodiments, the audio signal may be associated with an audio file that is stored locally on a computing device 101 or stored on a remote server. For example, in some embodiments, the audio signal may comprise an audio file that is stored on a server and downloaded to the user on demand.

The method 400 continues when processor 102 determines a haptic effect based on the audio signal 404. In some embodiments, the haptic effect may comprise a vibration output by one or more haptic output device(s) 118. In some embodiments, this vibration may be used to enhance the user's perception of an audio track playing on the computing device 101. Similarly, in some embodiments, the haptic effect may comprise a variation in the coefficient of friction on touch surface 116. In other embodiments, the haptic effect may comprise a simulated texture on the surface of touch surface 116 (e.g., the texture of one or more of: water, grass, ice, metal, sand, gravel, brick, fur, leather, skin, fabric, rubber, leaves, or any other available texture).

In some embodiments, processor 102 may rely on programming contained in haptic effect determination module 126 to determine the haptic effect. For example, the processor 102 may access drive signals stored in memory 104 and associated with particular haptic effects. As another example, a signal may be generated by accessing a stored algorithm and inputting parameters associated with an effect. For example, an algorithm may output data for use in generating a drive signal based on amplitude and frequency parameters. As another example, a haptic signal may comprise data sent to an actuator to be decoded by the actuator. For instance, the actuator may itself respond to commands specifying parameters such as amplitude and frequency.

Further, in some embodiments, users may be able to select a vibration, texture, variance in the coefficient of friction, or other haptic effect associated with an audio file in order to customize computing device 101. For example, in some embodiments, a user may select a haptic effect such as a surface texture to allow for personalization of the feel of a touch interface. In some embodiments, this haptic effect may be associated with a ringtone, e.g., for an incoming call, email, text message, alarm, or other event. In some embodiments, the user may select these personalized haptic effects or surface textures through modifying settings or downloading software associated with particular effects. In other embodiments, the user may designate effects through detected interaction with the device. In some embodiments, this personalization of haptic effects may increase the user's sense of ownership and the connection between the user and his or her device.

In still other embodiments, device manufacturers, artists, videographers, or software developers may select distinctive haptic effects, such as surface textures, to brand their devices, user interfaces, or artistic works (e.g., songs, videos, or audio tracks). In some embodiments, these haptic effects may be unique to branded devices and similar to other distinctive elements that may increase brand awareness. For example, many mobile devices and tablets may comprise a custom or branded home screen environment. For example, in some embodiments, devices produced by different manufacturers may comprise the same operating system; however, manufacturers may distinguish their devices by modifying this home screen environment. Similarly, videos or audio tracks produced by a certain company may comprise a specific type of haptic effect. Thus, in some embodiments, some device manufacturers, production companies, or software developers may use haptic effects such as textures or friction based effects to create a unique and differentiated user experience.

In some embodiments, the processor 102 may implement a "haptic profile." A haptic profile may comprise specific algorithms or settings configured to cause processor 102 to determine haptic effects with certain characteristics. In some embodiment, a haptic profile may be created or specified by a user or a designer. Further, in some embodiments, a device may comprise pre-programmed haptic profiles. In some embodiments, these haptic profiles may comprise, e.g., a haptic profile designed to output: active effects, subtle effects, or customized profiles for particular types of audio signals (e.g., a specific haptic profile for music, speech, special effects, movie types (e.g., action, drama, thriller, horror, comedy)), sporting events, or author types of signals described herein. For example, in one embodiment, a user may specify a particular haptic profile associated with rock music and a different haptic profile associated with sporting events.

The method 400 continues when processor 102 outputs a haptic signal associated with the haptic effect 406. The processor 102 outputs the haptic signal to a haptic output device 118 configured to output the haptic effect. In some embodiments, haptic output device 118 may output the haptic effect onto touch surface 116. In some embodiments haptic output device 118 may comprise traditional actuators such as piezoelectric actuators or electric motors coupled to touch surface 116 or other components within computing device 101. In other embodiments haptic output device 118 may comprise electrostatic actuators configured to simulate textures or vary coefficients of friction using electrostatic fields. In some embodiments, processor 102 may control a plurality of haptic output devices to simulate multiple haptic effects. For example, in one embodiment, processor 102 may control an electrostatic actuator to simulate a texture on the surface of touch surface 116 and processor 102 may further control other haptic output devices 118 to simulate other characteristics. For example, haptic output devices 118 may comprise actuators configured to output other effects, such as vibrations configured to simulate barriers, detents, movement, or impacts on touch surface 116. In some embodiments, processor 102 may coordinate the effects so the user can feel a plurality of effects together when interacting with touch surface 116.

Then processor 102 outputs the audio signal 408. In some embodiments, processor 102 may output the audio signal to an audio output device such as a speaker, headphone, or ear bud. In some embodiments, the audio output device may be integrated into computing device 101. In other embodiments, the audio output device may be coupled to computing device 101. Further, in some embodiment, the audio signal may be synchronized to the haptic effects, e.g., in some embodiments, the haptic effect may be output substantially simultaneously as a corresponding audio effect.

Turning now to FIG. 5, FIG. 5 is a flowchart showing an illustrative method 500 for determining haptic effects associated with audio signals. The method 500 begins when processor 102 identifies components in an audio signal 502. Various example methods for identifying components in an audio signal are discussed in further detail below. In some embodiments, these components may be associated with changes in the amplitude, frequency, tone, pitch, or speed of the audio signal. These changes may be associated with, for example, a change in musical instrument, a scene change in a movie, a change in source (e.g., a change in speaker), or some other transition commonly found in audio files.

The method 500 continues at step 504 when processor 102 determines a haptic effect associated with the components determined in step 502. In some embodiments, the haptic effect may be configured to simulate the component. For example, if the determined component is associated with action (e.g., gunfire or explosions) the haptic effect may comprise a high intensity haptic effect. In other embodiments, the haptic effect may comprise a less intense haptic effect, e.g., an effect associated with peaceful music, such as that generated by a pan flute. Alternatively, in some embodiments, determining a haptic effect comprises determining that no haptic effect should be associated with a component. For example, in one embodiment, background noises may comprise no haptic effect. Thus, when the system determines or identifies, a component associated with background noise, the system may determine no haptic effect. Similarly, in some embodiments, the system may determine that a component associated with speech should have no haptic effect. Further, in one embodiment, the system may isolate the components (e.g., background noises) and determine to remove haptic effects associated with those components. For example, in one embodiment, the system may clean a haptic track created by automatic conversion to remove haptic effects associated with the components.

Further, in some embodiments, the processor 102 may synch the haptic effect(s) to the components. In some embodiments, synching haptic effect(s) to the components comprises configuring the processor 102 to output a haptic signal associated with the haptic effect at a time that substantially corresponds to the audio effect. In other embodiments, the haptic effects may be output at some period after the audio effect. For example, in some embodiments, the processor 102 may output a haptic effect that acts as an echo. For example, in one embodiment, the audio track may comprise components such as a sound simulating a gunshot. In such an embodiment, the processor may determine a haptic effect that coincides with the audio effect. The processor may further determine a second haptic effect to be output a few second later to simulate an echo associated with the gunshot.

Figure 6:
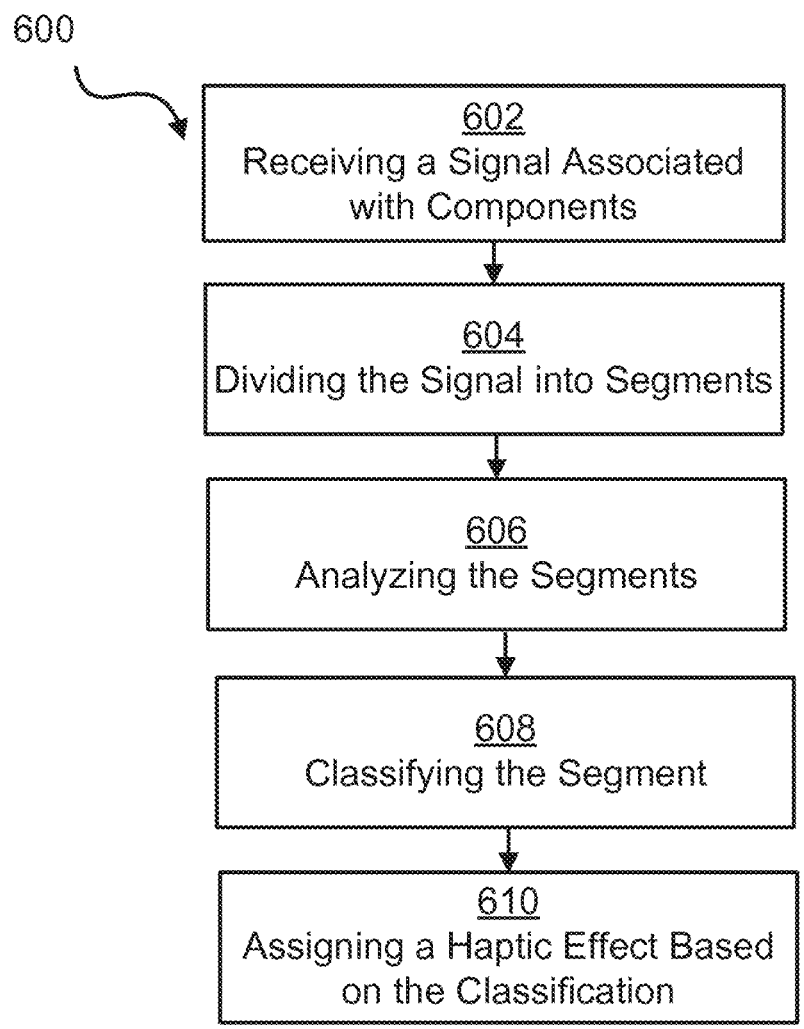
FIG. 6 illustrates a flow chart for a method for generating haptic effects associated with audio signals according to one embodiment.
Figure 7:
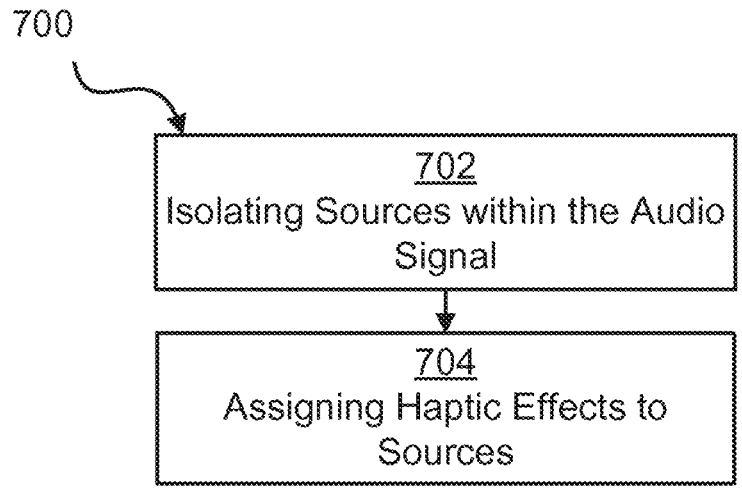
FIG. 7 illustrates a flow chart for a method for generating haptic effects associated with audio signals according to one embodiment.
Figure 8:
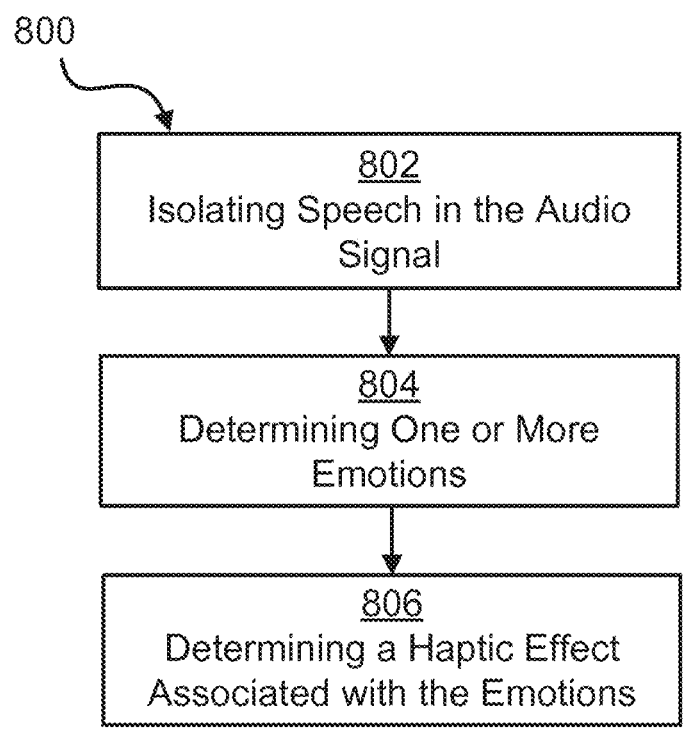
FIG. 8 illustrates a flow chart for a method for generating haptic effects associated with audio signals according to one embodiment.

Illustrative Methods for Determining Haptic Effects Associated with Audio Signals FIGS. 6-8 are flowcharts showing illustrative methods 600, 700, and 800 for determining haptic effects associated with audio signals. In some embodiments, the steps in FIGS. 6-8 may be implemented in program code executed by a processor, for example, the processor in a general purpose computer, mobile device, or server. In some embodiments, these steps may be implemented by a group of processors. In some embodiments the steps shown in FIGS. 6-8 may be performed in a different order. Alternatively, in some embodiments, one or more of the steps shown in FIGS. 6-8 may be skipped, or additional steps not shown in FIG. 6-8 may be performed. The steps in FIGS. 6-8 are described with regard to an audio signal. However, in some embodiments, the methods may be used to determine haptic effects associated with other types of signals, e.g., pressure, acceleration, velocity, or temperature signals.

In some embodiments, the methods described in FIGS. 6-8 may be implemented by a device coupled to a haptic output device that ultimately outputs the haptic effect. In other embodiments, the methods described in FIGS. 6-8 may be implemented by a haptic developer or content creator. In such an embodiment, the methods may be implemented as part of a toolbox that helps a designer or content creator assign haptic effects to multimedia content. For example, in some embodiments these methods may be found as part of a plugin for audio or audio-visual editing software (e.g., a haptic studio, or a mobile application for developing haptics).

Turning now to FIG. 6, FIG. 6 illustrates a flow chart for a method 600 for generating haptic effects associated with audio signals according to one embodiment. As shown in FIG. 6, the method 600 begins when processor 102 receives a signal associated with one or more components. In some embodiments, these components may comprise methods or systems associated with Acoustic Event Detection (AED) or Automatic Speech recognition (ASR). Further, in some embodiments these methods use audio features associated with one or more of Mel Frequency Cepstral Coefficients (MFCC) along their first and second derivatives, MPEG-7 spectral features, Critical Band combined with Teager Energy Operator features (CB-TEO), Periodicity of the signal, Wavelet based cepstral coefficients, Spectral centroid, Spectral asymmetry, Spectral bandwidth, Zero Crossing Rate (ZCR), Linear Predictor Coefficient (LPC), Linear Predictive Cepstral Coefficients (LPCC), Log Frequency Cepstral Coefficients (LFCC), or Fundamental frequency. In some embodiments, these components may be identified or tagged by a user who will listen to an audio file. In other embodiments, these components may be identified or tagged by a programmer or artist who developed the audio track.

Next at step 604, the processor 102 divides the audio signal into one or more segments 604. In some embodiments, these segments may comprise overlapping segments, or alternatively, in some embodiments the segments may comprise non-overlapping segments. In some embodiments these segments may comprise time segments. For example, in some embodiments, the segments may comprise time segments of a predetermined period, e.g., every 1, 0.5, 0.1, or 0.01 second. In other embodiments, the segments may comprise time segments that vary in value. In still other embodiments, the segment may comprise a different measurement of the audio signal. For example, in one embodiment, the segment may comprise an amplitude segment, e.g., components of the signal within a certain amplitude range may form a segment. In still other embodiments, the segment may comprise a frequency range within the signal. In such an embodiment, components of the audio signal within that frequency range may form the segment. In some embodiments, an example frequency range may comprise a range from 50 Hz to 200 Hz, or 1,000 Hz to 10,000 Hz.

Then at step 606, the processor 102 analyzes the segments. The processor 102 analyzes the segment to identify one or more of the components discussed above in step 602. For example, the processor 102 may determine if a component such as speech or music is present. In some embodiments, the processor 102 may analyze the segment using one of Acoustic Event Detection (AED) or Automatic Speech recognition (ASR). In some embodiments, the analysis may comprise one or more of a frequency, amplitude, tone, or pitch based analysis. For example, in some embodiments the processor may perform a Fast Fourier Transform (FFT) on the audio signal, and then analyze the audio signal in the frequency domain. For example, in one embodiment, the processor 102 may analyze the segment by performing an FFT and then separating the peak frequency components. The processor may further access a database of audio signal data (e.g., a remote database accessible via network 110 or a local database stored in storage 114) and compare the segment to the database. In some embodiments, this may enable the processor to isolate the source of an audio effect, e.g., to isolate a speaker or isolate a musical instrument or special effect (e.g., effects found in action movies such as gun shots, explosions, or engine sounds).

Next at step 608 the processor 102 classifies the segments. In some embodiments, the processor 102 may classify the segments based on values of specific audio features in the segment or presence of a specific component in the segment. In some embodiments, an algorithm for classification (e.g., a recognition algorithm) may compare the components or feature values of the segment against different models describing the different components or features. This algorithm may further classify the segment based on the most probable model label.

In some embodiments, a model may be devised based on types of components associated with that model. In one embodiment, a model for one type of component or feature may be constructed using components or features from a database of audio segments previously automatically or manually labeled with the same type. In some embodiments, this database may comprise a large database comprising a plurality of classifiers configured to enable high speed searches associated with audio effects. In one embodiment, an example classification may comprise a classification system per component (e.g., speech recognition system) or a classification system that assigns a segment to one component among a set. Examples of classification techniques used for AED may include, for example, Gaussian Mixture Models (GMM), Support Vector Machine (SVM), Hidden Markov Models (HMM), K Nearest Neighbors (KNN), Decision trees, Artificial Neural Network (ANN), Vector Quantization (VQ), or Bayesian Networks (BN). Further, in some embodiments, the processor 102 may access the database to store a specific feature or component, or alternatively, to perform a search on the database associated with the feature or component.

Then at step 610, the processor 102 assigns a haptic effect based on the classification. In some embodiments, the haptic effect may comprise a specific type of effect associated with the classification. For example, in some embodiments, a specific class of signal may comprise a specific haptic effect. In such an embodiment, for example, speech may comprise a specific frequency vibration, while another audible effect, such as a car running, may comprise a different frequency vibration. Further, in some embodiments, the processor 102 may determine that certain classes of audio signals should have no haptic effect. For example, in some embodiments the processor 102 may determine that background noise or speech should not be associated with any haptic effect. For example, in one embodiment a user or designer may adjust a setting such that the processor 102 will determine not to output a haptic effect associated with background noise or speech. Further, in one embodiment, a user or designer may adjust a setting such that processor 102 performs a search of an audio file and cleans a haptic track to remove haptic effects associated with background noise or speech.

Turning now to FIG. 7, FIG. 7 illustrates a flow chart for a method 700 for generating haptic effects associated with audio signals according to one embodiment. As shown in FIG. 7, the method 700 begins when processor 102 isolates sources within the audio signal 702. In some embodiments, the processor 102 may implement one or more of a plurality of different methods for isolating audio sources. In some embodiments, these methods may comprise methods for Acoustic Event Detection (AED) or Automatic Speech recognition (ASR). Further, in some embodiments these methods may include algorithms configured to use one or more of Mel Frequency Cepstral Coefficients (MFCC) along their first and second derivatives, MPEG-7 spectral features, Critical Band combined with Teager Energy Operator features (CB-TEO), Periodicity of the signal, Wavelet based cepstral coefficients, Spectral centroid, Spectral asymmetry, Spectral bandwidth, Zero Crossing Rate (ZCR), Linear Predictor Coefficient (LPC), Linear Predictive Cepstral Coefficients (LPCC), Log Frequency Cepstral Coefficients (LFCC), or Fundamental frequency.

Next at step 704 the processor 102 assigns haptic effects to the sources. For example, in some embodiments the processor may determine that haptic effects should be associated with only certain sources. For example, the processor may apply haptic effects to audio associated with music, but remove or "clean" haptic effects associated with speaking. Similarly, the processor may determine specific effects for audio that is associated with effects such as gunfire, engine noise, weather noise, or background noise. In some embodiments, the processor 102 may assign multiple actuators to different audio effects. For example, the processor 102 may assign a first haptic output device 118 to generate haptic effects associated with one source (e.g., a first speaker or a first guitar) and assign a second haptic output device 118 to generate haptic effects associated with a second source (e.g., a second speaker or special effects in the audio signal).

Turning now to FIG. 8, FIG. 8 illustrates a flow chart for a method 800 for generating haptic effects associated with audio signals according to one embodiment. As shown in FIG. 8, the method 800 begins at step 802 when processor 102 isolates speech in an audio signal. In some embodiments, the processor 102 isolates speech by classifying segments of the audio signal, for example, by using identifying audio features or components in the audio signal. In some embodiments, the processor 102 may access a local or remote database of pre-tagged audio signals. This database may include sounds of different types, different speakers, and with different levels of noise. In some embodiments, the processor may classify signals as speech using one or more of: Signal energy, High/low energy, Mel Frequency Cepstral Coefficients (MFCC) and its derivatives, Linear Frequency Cepstral Coefficients (LFCC) and its derivatives, Zero Crossing Rates (ZCR), autocorrelation frequency, or spectral gravity center. Further, in some embodiments the classifiers used for the discrimination task may include: Neural networks, Gaussian Mixture Models (GMM), or Hidden Markov Models (HMM).

The method 800 continues when processor 102 determines one or more emotions associated with the speech 804. The emotional state of the speaker influences his or her speech patterns. For example, a speaker's emotions may cause the speaker to vary intonation, volume, speed, or other speech parameters. In some embodiments, the processor 102 determines emotions in the speech by again classifying the signal. In some embodiments, this classification comprises estimating one or more feature values or components from the audio signal and classifying them against a local or remote database of speech samples tagged with the emotional state of the speaker. In some embodiments, an algorithm for classification (e.g., a recognition algorithm) may compare the components or feature values of the segment against different models describing different emotions. This algorithm may further classify the segment based on the most probable emotion. In some embodiments, a model may be devised based on types of emotions associated with that model. In one embodiment, a model for one type of emotion may be constructed using components or features from a database of audio segments previously labeled (e.g., manually or automatically) with the same emotion. In some embodiments, the database may be large enough to include samples of speakers of different ages, genders, emotional states and accents/languages. Further, in some embodiments, the types of emotions that can be detected include: neutral, joy, anger, sadness, aggressiveness, boredom, disgust, fear, stress, surprise, or indignation.

The processor 102 may use multiple different components for emotion detection. In some embodiments, these components may comprise frequency based components, e.g., fundamental frequency change, average pitch, pitch range, spectral features, MFCC, LFCC, formant features, or contour slope. In other embodiments, these components may comprise time based components, e.g., speech rate, stress frequency, energy, or ZCR. In still other embodiments, these components may comprise voice quality parameters, e.g., breathiness, brilliance, loudness, pause discontinuity, or pitch discontinuity. For example, in some embodiments, anger and aggressiveness can be translated with high amplitude and fast speech with strong high frequency energy and a wider pitch range. In other embodiments, sadness may produce a slow and low pitched signal. In some embodiments, the classifiers that might be used for the emotion classification task may include: Neural Networks, SVM, GMM, HMM, KNN, or decision trees.

Further, in some embodiments, the audio signal may comprise a feature which acts as a descriptor of an audio segment, which in some embodiments may enable an algorithm to classify a segment of the audio signal, for example, by identifying an emotion. In one embodiment, Mel-frequency cepstrums (MFCC) may be used as audio features used for classification. In such an embodiment, the system may identify events or sources using those MFCCs or other features or descriptors.

The method 800 continues when processor 102 determines a haptic effect associated with the emotions 806. In some embodiments, the processor 102 may determine rather than generating a haptic effect to generate haptic silence. For example, for some emotions (e.g. depression, sadness) the processor 102 may cancel all haptic effects in this segment. The processor 102 may also assign a haptic theme to a segment. For example, the detected emotion might be used to modulate the haptic effects in the segment/scene to make it more relevant. These haptic effects might be created by automatic conversion (audio and/or video) and can be related to speech or any other sound. For example, in an action movie scene with anger and stress emotions from the actors, the haptic effect may be determined to simulate a similar state of stress for the viewer. In such an embodiment, the processor 102 may be configured to boost all the haptic effects in a stressful scene. In other embodiments, when the scene is cheerful, the processor may be configured to attenuate one or more haptic effects associated with the scene. In still other embodiments, the processor 102 may be configured to determine a preset effect. In such an embodiment, rather than using automatic conversion, the processor 102 may generate effects directly from tagged emotions. For example, in one embodiment, emotions may be tagged by a user, programmer, or content creator. In some embodiments, a preset effect can be designed to fit the emotional state of the speaker and, in such an embodiment, it may be played along the speech to reflect and emphasize this state. In still other embodiments, instead of using automatic conversion algorithms that might not fit the speech signal, the processor 102 may be configured to cancel all effects related to speech in the automatically created haptic track. In such an embodiment, the processor 102 may process the speech independently with an algorithm designed specifically for emotion detected. Further, in some embodiments, the processor 102 may apply a predetermined algorithm for speech to haptics based on the determined emotion. For example, in one embodiment, the processor may comprise a plurality of automatic speech to haptics algorithms that are each associated with a plurality of emotions. In such an embodiment, when the processor 102 determines one of the emotions, the processor 102 may determine the haptic effect using the corresponding algorithm.

Figure 9A:
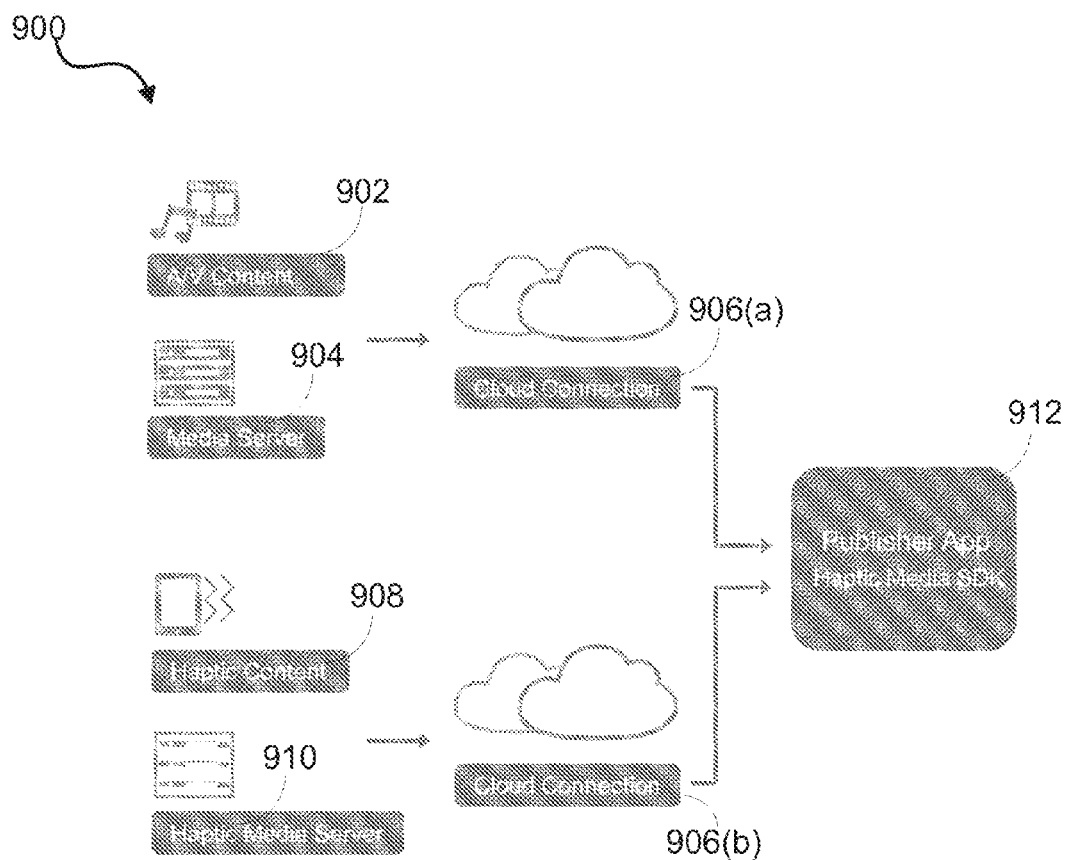
FIG. 9A illustrates a system overview for generating content with A/V signals according to one embodiment.
Figure 9B:
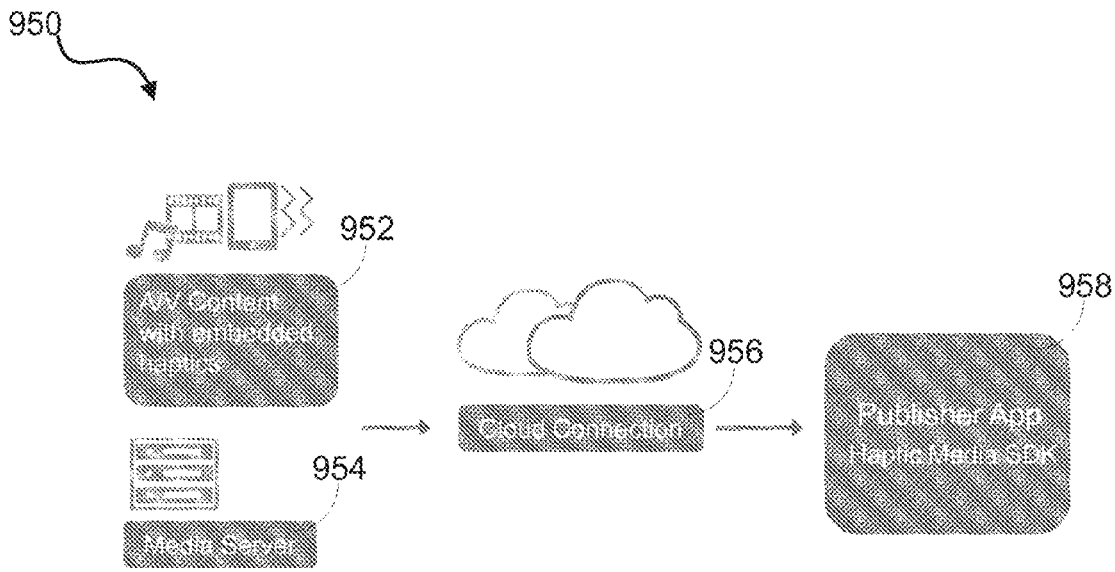
FIG. 9B illustrates a system overview for generating content with A/V signals according to another embodiment.

Illustrative Systems for Generating Tactile Content Associated with Audio Signals to Create Tactile Media Turning now to FIGS. 9A and 9B, embodiments for a system environment for creating tactile content are set forth. As shown in FIG. 9A, system 900 comprises A/V content 902 stored on one or more media server(s) 904 and haptic content 908 stored on one or more haptic media server(s) 910. As shown in system 900, each of media server(s) 904 and haptic media server(s) 910 comprise one or more server(s) with standard components known in the art, e.g., processor, memory, data storage, network connection(s), and software configured to store and access data stored on the server. Both the media server(s) 904 and the haptic media server(s) 910 are coupled to one of cloud connections 906(a) or 906(b). Cloud connections 906(a) or 906(b) comprise wired and/or wireless internet connections as is known in the art.

As shown in system 900, A/V content 902 (such as an audio, image, or video file), is transmitted separately from haptic content 908 (such as a haptic track as described above). When received, e.g., by a computing device of the types described above, an application such as a publisher application 912 (e.g., a tactile-enabled Android app or haptic media SDK) may be accessed to sync and/or play the video and tactile streams.

In another embodiment, shown in FIG. 9B as system 950, A/V content with embedded haptic information 952 is stored on one or more media server(s) 954. These media server(s) may be coupled to one or more cloud connection(s) 956. In such an embodiment, an application such as a publisher application 958 (e.g., a tactile-enabled Android app or haptic media SDK) may be accessed to determine and/or play the A/V content and embedded haptic content 952.

Advantages of Systems and Methods for Generating Haptic Effects Associated with Audio Signals There are numerous advantages of generating haptic effects associated with audio signals. For example, automatic audio to haptics conversion algorithms may try to haptify as much audio content as possible without any distinction between the different sounds mixed in the signal. However, this approach leads to undesirable haptic effects because the haptic effect can become overwhelming. For example, when automatically creating haptic effects for a movie using its audio track, speech and background music might get haptified. Those effects are irrelevant for most users and thus can downgrade their experience. However, embodiments of the present disclosure allow for automatic audio to haptics conversion that intelligently assigns haptic effects to only certain audio effects. This prevents the end haptic effect from being overwhelming.

Further, embodiments of the present disclosure enable the user, content creator, or system designer to specify the components of an audio signal that should comprise haptic effects. This enables the user, content creator, or system designer to automatically create more compelling haptic effects for audio signals, because the user can specify certain sources for which there will be no haptic output. For example, some types of components may be annoying if haptified, in some embodiments, these components may include, e.g., keyboard typing, music beats, applauses, cheers, classical music, shouting, etc. Systems and methods disclosed herein may enable a designer to avoid haptifying these components, or to remove haptic effects associated with these components from a haptic track.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system for outputting haptic effects comprising:
a processor configured to:
receive an audio signal;
identify one or more audio components in the audio signal;
identify background noises in the audio signal;
determine a haptic effect associated with the one or more audio components;
store the haptic effect in a haptic track on a data store;
output a haptic signal associated with the haptic effect; and
output the audio signal to an audio output device configured to output an audible effect.

2. The system of claim 1, wherein the processor is further configured to determine not to output a haptic effect associated with the background noises.

3. The system of claim 1, wherein identifying one or more audio components of the audio signal comprises:
receiving a signal associated with one or more audio components;
dividing the audio signal into a plurality of segments;
analyzing one of the plurality of segments to determine if one or more of the components is present; and
classifying the segment based on a presence of one or more of the components.

4. The system of claim 3, wherein analyzing one of the plurality of segments comprises implementing an acoustic event detection technique.

5. The system of claim 4, wherein the acoustic event detection technique comprises automatic speech recognition.

6. The system of claim 3, wherein classifying one of the plurality of segments comprises comparing the segment to a database of data associated with the one or more components.

7. The system of claim 3, wherein determining a haptic effect comprises assigning a haptic effect based on the classification of the segment.

8. The system of claim 1, wherein identifying one or more audio components of the audio signal comprises isolating speech in the audio signal.

9. The system of claim 1, wherein identifying one or more audio components of the audio signal comprises isolating sounds associated with action effects in the audio signal.

10. The system of claim 1, further comprising a haptic output device configured to receive the haptic signal and output the haptic effect.

11. A method for outputting haptic effects comprising:
receiving an audio signal;
identifying one or more audio components in the audio signal;
identifying background noises in the audio signal;
determining a haptic effect associated with the one or more audio components;
storing the haptic effect in a haptic track on a data store;
outputting a haptic signal associated with the haptic effect; and
outputting the audio signal to an audio output device configured to output an audible effect.

12. The method of claim 11, further comprising determining not to output a haptic effect associated with the background noises.

13. The method of claim 11, wherein identifying one or more audio components of the audio signal comprises:
receiving a signal associated with one or more audio components;
dividing the audio signal into a plurality of segments;
analyzing one of the plurality of segments to determine if one or more of the components is present; and
classifying the segment based on a presence of one or more of the components.

14. The method of claim 13, wherein analyzing one of the plurality of segments comprises implementing an acoustic event detection technique.

15. The method of claim 14, wherein the acoustic event detection technique comprises automatic speech recognition.

16. The method of claim 13, wherein classifying one of the plurality of segments comprises comparing the segment to a database of data associated with the one or more components.

17. The method of claim 13, wherein determining a haptic effect comprises assigning a haptic effect based on the classification of the segment.

18. The method of claim 11, wherein identifying one or more audio components of the audio signal comprises isolating speech in the audio signal.

19. The method of claim 11, wherein identifying one or more audio components of the audio signal comprises isolating sounds associated with action effects in the audio signal.

20. A non-transitory computer readable medium comprising program code, which when executed by a processor, is configured to cause the processor to:
receive an audio signal;
identify one or more audio components in the audio signal;
identify background noises in the audio signal;
determine a haptic effect associated with the one or more audio components;
store the haptic effect in a haptic track on a data store;
output a haptic signal associated with the haptic effect; and
output the audio signal to an audio output device configured to output an audible effect.

* * * * *